No. 716,308. Patented Dec. 16, 1902.
J. G. SUTHERLAND & F. D. MILLARD.
MEANS FOR SUPPLYING WATER TO BOILERS.
(Application filed Apr. 27, 1901.)
(No Model.) 2 Sheets—Sheet 1.
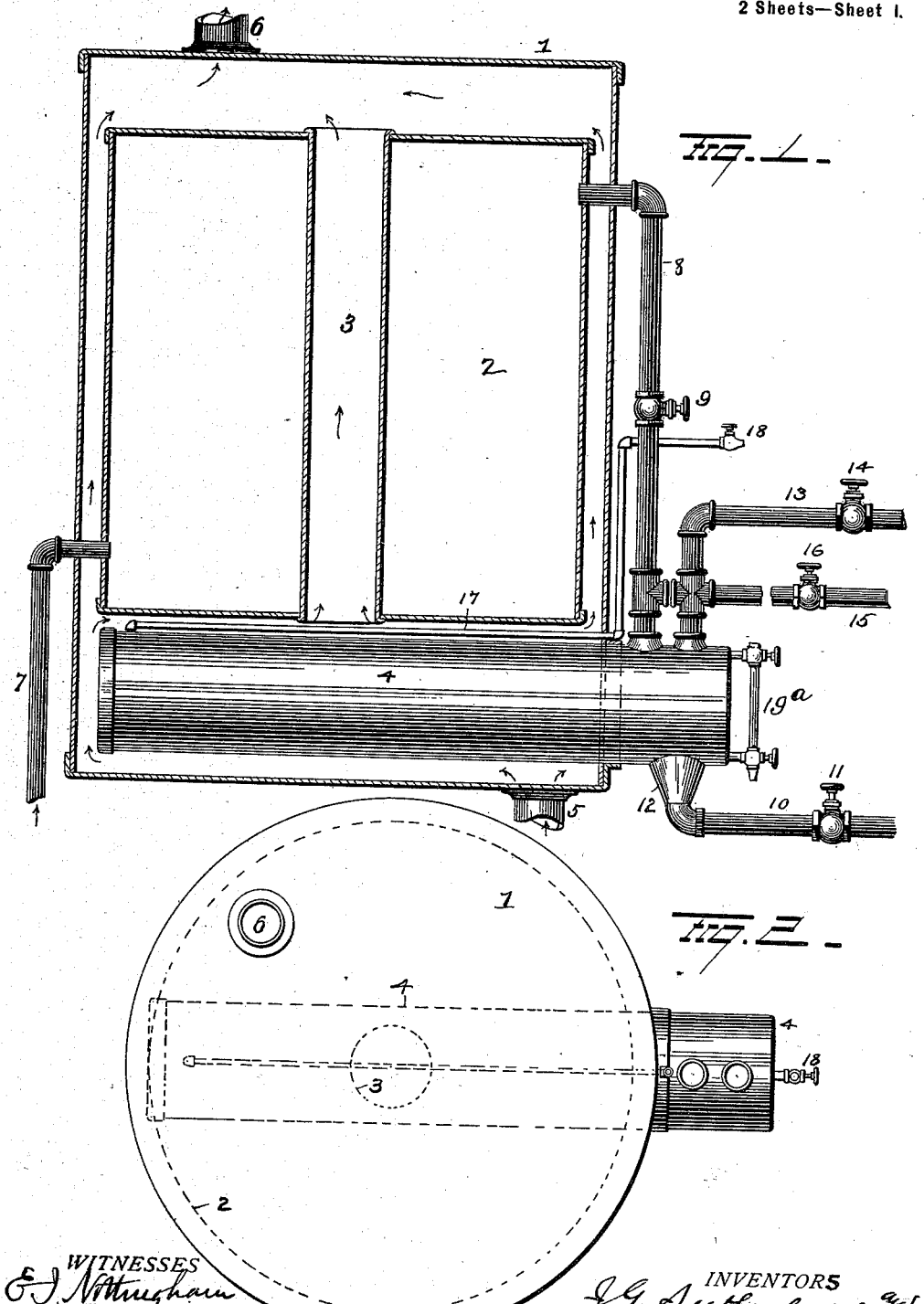

No. 716,308. Patented Dec. 16, 1902.
J. G. SUTHERLAND & F. D. MILLARD.
MEANS FOR SUPPLYING WATER TO BOILERS.
(Application filed Apr. 27, 1901.)
(No Model.) 2 Sheets—Sheet 2.
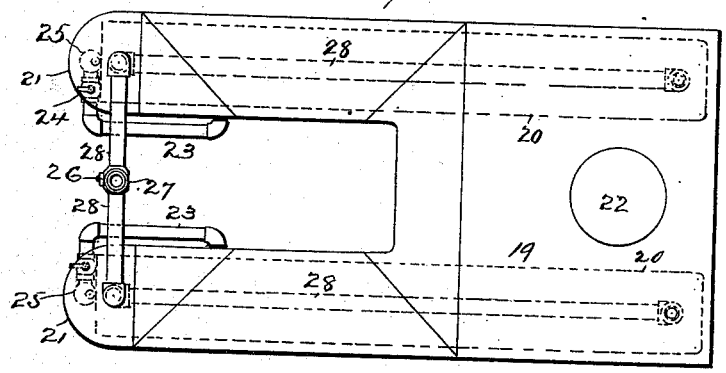
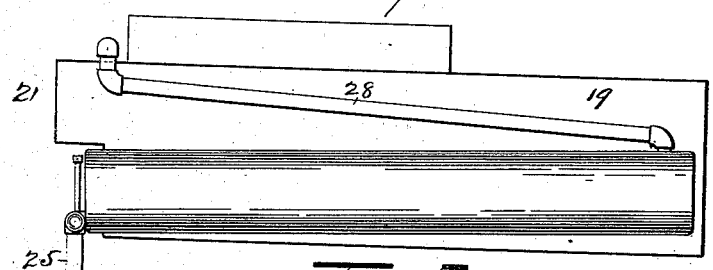
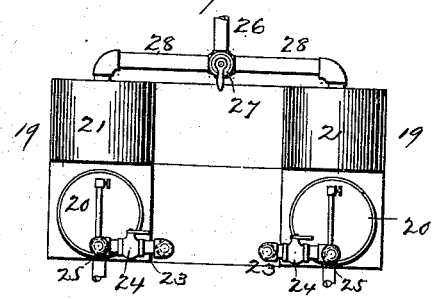
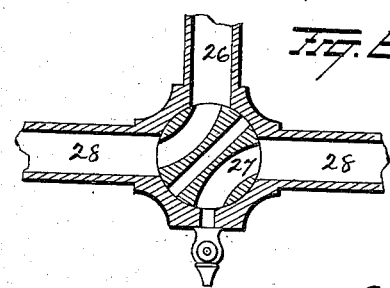
WITNESSES
INVENTORS

UNITED STATES PATENT OFFICE.

JOHN G. SUTHERLAND AND FRED D. MILLARD, OF BURLINGTON, IOWA; SAID MILLARD ASSIGNOR TO SAID SUTHERLAND.

MEANS FOR SUPPLYING WATER TO BOILERS.

SPECIFICATION forming part of Letters Patent No. 716,308, dated December 16, 1902.

Application filed April 27, 1901. Serial No. 57,755. (No model.)

*To all whom it may concern:*

Be it known that we, JOHN G. SUTHERLAND and FRED D. MILLARD, residents of Burlington, in the county of Des Moines and State of Iowa, have invented certain new and useful Improvements in Means for Supplying Water to Boilers; and we do hereby declare the following to be a full, clear, and exact description of the invention, such as will enable others skilled in the art to which it appertains to make and use the same.

Our invention relates to improved means for supplying water to boilers and especially for supplying water of a high degree of temperature to such boilers, the main object of the invention being to provide a device of this character in which water under pressure will be supplied to the service-boiler.

A further object of the invention is to utilize the exhaust-steam from the engine to heat water for the boiler-supply to the highest practicable temperature and to introduce the same by means of pressure, preferably that of compressed air, at the highest degree of heat obtainable.

A further object is to provide an apparatus of the above-mentioned character which will insure an ever-ready and constant supply of water of a high temperature for the boiler and at the same time to have a device which will be simple in construction, absolutely sure in operation, with the use of a minimum amount of fuel.

With these objects in view the invention consists in certain novel features of construction and combinations and arrangements of parts, as will be more fully hereinafter described, and pointed out in the claims.

In the accompanying drawings, Figure 1 is a view, partly in section, illustrating our improvements. Fig. 2 is a top view. Fig. 3 is a top view illustrating our improvements modified for use in connection with locomotive-boilers. Fig. 4 is a side view of the same, partly in section. Fig. 5 is a front view, and Fig. 6 is an enlarged view in section, illustrating the valve 27.

1 represents a casing in which is secured a tank 2, smaller than the casing to leave a space all around the same and provided with a vertical tube 3, passed entirely through the tank 2. While we have shown the casing 1 and the tank 2 cylindrical, we would have it understood that we may make them rectangular or any shape which is best adapted for the location of the apparatus and may employ more than one tube 3 in tank 2 or may dispense with the use of any tubes, as their only use is to expose the water contained in the tanks 2 to a greater heating-surface, (as will be fully hereinafter explained,) and it may be found in some instances unnecessary to employ any tubes 3.

An auxiliary tank 4 is located in casing 1 below the tank 2 and preferably projects at one end through the wall of the casing. A pipe 5 connects the bottom of the casing 1 with the exhaust of the engine to supply exhaust-steam to the casing, which steam circulates around the auxiliary tank 4 and main tank 2 and escapes through an exhaust-pipe 6 in the top of the casing 1. The pipe 5 may also connect with the blow-off of the engine, so as to utilize that steam for heating purposes.

Water is supplied to the bottom of the tank 2 by a pipe 7, connected to any desired source of supply, and a pipe 8 connects the upper portion of the main tank 2 with the auxiliary tank 4 on the top of the latter at its protruding end and is provided between its ends with a valve 9. A pipe 10 connects the bottom of the protruding end of tank 4 with the boiler and is provided with a valve 11 and at its juncture with tank 4 preferably made flaring or cup-shaped, as shown at 12. A steam-pipe 13 connects the upper end of tank 4 with either the steam-dome of the boiler or with a supplementary boiler, which carries a greater steam-pressure than the battery of service-boilers which are to be supplied with hot water and is provided with a valve 14, and an air-supply pipe 15, having a valve 16 therein, communicates with pipe 13 near tank 4 and is adapted to supply compressed air, which at will may be of less, the same, or greater pressure than the pressure of the service-boiler to the tank 4.

The apparatus for compressing the air is immaterial, any well-known device for this purpose being employed. A small air-exhaust pipe 17 communicates with tank 4 at the top of its inner end, passes through the casing 1, and is provided at its discharge end with a valve 18.

A suitable glass-tube water-gage 19ª is located on the protruding end of tank 4 to demonstrate at all times the depth of water in the tank.

In practical use the tank 4 is or may be duplicated, so that while one is being filled, as hereinafter described, the use of the other will insure a steady and uniform supply of water to the service-boiler.

The operation of our improvements above described is as follows: The main tank 2 is filled with water by the pipe 7, and the cock 9 is opened to allow the water to fill tank 4 to the proper level and again closed. Exhaust-steam from the engine or blow-off steam from the boiler enters casing 1 through pipe 5 and circulates about tanks 4 and 2 and through the tube 3 to heat the water in said tanks. Valve 16 is opened to admit compressed air in the tank 4 through pipe 15 and bring the pressure in said tank up to a pressure greater than that of the service-boiler, so that when valve 11 is open the pressure in the tank will force open the check-valve of said service-boiler and supply the water thereto at the temperature to which it has been heated, which ordinarily will be high. If the water in tank 4 is not up to the desired temperature, steam can be admitted through pipe 13 to bring it up. If it is not desired to use compressed air, any other suitable pressure may be applied to the water in tank 4, it being understood that the main object of the auxiliary tank in ordinary construction is that water may be furnished to the service-boiler without the intervention of the ordinary pump or injector. When the water gets low in tank 4, valves 11 and 16 are closed and valves 18 and 9 opened, the former permitting the air in tank 4 to escape, while the latter permits the heated water at the top of tank 2 to fill tank 4 to the proper level. When this is completed, the tank is ready for operation as before. While this tank 4 is being filled, its duplicate can be used, if the auxiliary tank is in duplicate, as hereinbefore pointed out.

When our improvements are for use on locomotive-boilers, they are constructed as shown in Figs. 3, 4, 5, and 6. In this form of our invention 19 represents the main tank, having the peculiar shape shown to conform to the lines of the tender. In each side of the tank 19 auxiliary tanks 20 are located, the forward ends of tanks 20 projecting out of tank 19, but disposed beneath protruding portions 21 thereof. The tank 19 is filled with water through a suitable manhole 22, and the latter is so arranged that it may be closed airtight by any desired means. The main tank 19 is connected to the respective auxiliary tanks 20 by short pipes 23, and suitable valves 24 are provided in said pipes 23 to regulate the feed of water therethrough, and pipes 25 connect the forward ends of tanks 20 with the engine-boiler. An air-inlet pipe 26 is connected by a double by-pass valve 27 with pipes 28, which extend down through the top of tank 19 and through the same to the top of the inner ends of auxiliary tanks 20, which latter are slightly elevated at their inner ends to insure their emptying their entire contents. This valve 27 is so constructed that when turned to admit air (which, as in the former construction, exceeds the boiler-pressure) into one auxiliary tank the other will be permitted to exhaust the air therefrom, as clearly shown in Fig. 6. This valve 27 has a third passage 27ª, which allows the air to pass from one auxiliary tank to the other for the purpose of equalizing the air-pressure from the one that has been emptied of water and to that extent to save the pumping of air. In order to force the water from the main tank 19 into the auxiliary tank 20, air under pressure may be supplied to the main tank 19, in which case the construction hereinbefore described whereby the manhole might be closed by any suitable device would be employed. Exhaust-steam from the engine or blow-off steam may be admitted directly into tank 19 by a pipe at any suitable place to heat the water therein and in the tanks 20 to the proper temperature. The operation of this modified form of our invention is as follows: Assuming that the tanks 20 and 19 are filled with water and the engine in operation, one tank 20 is supplying the water to the boiler under pressure of compressed air greater than the boiler-pressure, in which case the water is supplied directly to the boiler without the intervention of a pump or injector. When the water in said tank is almost exhausted, the valve 27 is turned so as to admit the air from the emptied tank 20, which is under full pressure of the compressed air, through the passage 27ª in valve 27 into the other tank 20, thus equalizing the pressure in the two tanks 20. The valve 27 is then turned completely, so as to admit the pressure from the compressed-air reservoir to the other tank 20. At the same time the valve 24 is opened, or if it is desired to allow compressed air to escape into the atmosphere the valve 29 is opened. If the valve 24 is opened, the compressed air in the tank 20 escapes into tank 19, equalizing the pressure in the two tanks, in which event if the tank 19 is not closed air-tight the water will flow by gravity into the tank 20 and fill it. If, however, the manhole in tank 19 is closed and the pressures in tank 20 and tank 19 are equal, valve 29 may be opened, when the excess pressure in tank 19 will force the water rapidly through pipe 23 into tank 20, completely filling it, when valve 29 may be closed and the operation is ready to be repeated. It will thus be seen that when one tank 20 is being filled the other is in operation, so as to always supply water to the boiler, and as the exhaust-steam from the air-pump alone is ordinarily sufficient to heat the entire contents of the tank to a high temperature water will thus be supplied to the boiler at a high temperature, much higher than is practicable by any present known device. An additional advantage will be that the water thus heated will be freed of a large number of impurities by the high temperature.

With both forms of our invention it will be seen that with a pressure in the auxiliary tanks in excess of that in the boiler it is not necessary to employ an injector or pump for discharging the water into the boiler; but one can be employed, if desired. It is a known fact that with the appliances at present in use water at the atmospheric pressure cannot be furnished to the boiler at a higher temperature than 110° as a maximum, and in order to insure safety and certainty in operation a far less degree of heat is all that is practicable to be used.

It is a further well-known fact that at atmospheric pressure the water being thrown into the injector at a higher temperature than 110° will immediately turn into steam and the vacuum be destroyed, and thus the water will be kept out of the injector or pump, and the temperature of the water must be lowered before it can be passed through the ordinary injector or pump. With our apparatus, however, as indicated above, an injector or pump may be employed, in which event it will be unnecessary to have a pressure in the auxiliary tanks greater than the pressure in the boiler, but any pressure short of that may be used, with the result that the water under a pressure greater than the atmosphere can safely attain a higher degree of temperature and be passed in and through the injector or pump without turning into steam. In many cases it will be found impracticable to have a pressure in these auxiliary tanks higher than the boiler-pressure, but with any pressure whatever water of a far higher degree of heat can be passed through the injector or pump than by any means now in use.

The form of construction for locomotive-boilers as shown in the drawings and as described herein is the form which we preferably use; but, if it is desired, the tanks 20 may be entirely dispensed with and the boiler connection had directly with the tank 19. In this construction the manhole is closed airtight and the pressure in the tank 19 regulated by a suitable retaining-valve, so as to produce the greatest economy of operation consistent with the back pressure from the boiler, the exhaust-steam being sent into the tank 19. With this construction it will be necessary to use an ordinary injector or pump, but with the pressure in the tank 19 as indicated the water in tank 19 may be heated to a high degree of temperature safely and passed through the injector or pump without turning to steam, as is now the case.

With the water in the tank 19 under pressure and the exhaust-steam passing into tank 19 the water in said tank may be heated higher than 212°, and thus produce a pressure in addition to that furnished by the compressed air.

Various other slight changes might be resorted to in the general form and arrangement of the several parts described without departing from the spirit and scope of our invention, and hence we would have it understood that we do not wish to limit ourselves to the precise details set forth, but consider ourselves at liberty to make such slight changes and alterations as fairly fall within the spirit and scope of our invention.

Having fully described our invention, what we claim as new, and desire to secure by Letters Patent, is—

1. An apparatus for supplying water to service-boilers comprising a tank, means for heating the water in said tank and means independent of the service-boiler for injecting fluid under pressure into the water in said tank to raise the pressure of the water to a point in excess of the boiler-pressure.

2. In an apparatus for supplying water to boilers, the combination with a tank to contain water, means for utilizing the exhaust-steam to heat the water, and means for forcing air into the water in said tank to raise the pressure of said water to a point in excess of boiler-pressure.

3. In an apparatus for supplying water to boilers, the combination with a main tank, an auxiliary tank and a valved pipe connecting said tanks, of means for enveloping said tanks with steam to heat the water, and means for injecting fluid-pressure into the water in the auxiliary tank to raise the pressure of said water to a point in excess of the boiler-pressure.

4. In an apparatus for supplying water to boilers, the combination with a tank and a valved pipe connected to the tank for conducting water to the boiler to be supplied, of means for directing steam around said tank to heat the water therein, and means for directing air under compression into the water in said tank to raise the pressure of said water to a point in excess of boiler-pressure.

5. In an apparatus for supplying water to boilers, the combination with a casing, of main and auxiliary tanks inclosed in said casing, a steam inlet and outlet in said casing, a water-supply pipe communicating with the bottom of the main tank, a pipe connecting the top of the main tank with the auxiliary tank, a compressed-air-inlet pipe communicating with the auxiliary tank and a pipe for connecting the auxiliary tank with the boiler to be supplied.

6. In an apparatus for supplying water to boilers, the combination with a main tank, of two auxiliary tanks, pipes connecting the main tank with the auxiliary tanks, a pipe for supplying compressed air to both of said auxiliary tanks, and a valve in said pipe to permit the escape of air from one auxiliary tank at the same time it permits compressed air to pass into the other, and from one to the other.

7. In an apparatus for supplying hot water to service-boilers, the combination with a main tank, an auxiliary tank supplied thereby, means for heating the water in said tank, means for injecting air into said water to increase the pressure thereof and means for directing water from the auxiliary tank to the boiler.

8. The combination with a main tank, of two auxiliary tanks therein, pipes connecting the main tank with the auxiliary tanks, means for supplying compressed air to both of said auxiliary tanks, and means for permitting the air in one tank to pass into the other.

In testimony whereof we have signed this specification in the presence of two subscribing witnesses.

JOHN G. SUTHERLAND.
FRED D. MILLARD.

Witnesses:
CHAS. C. CLARK,
JNO. J. SEELEY.